(12) United States Patent
Gustafsson et al.

(10) Patent No.: US 7,905,348 B2
(45) Date of Patent: Mar. 15, 2011

(54) CARD ASSEMBLY

(75) Inventors: Peter Gustafsson, Älvsjö (SE); Johan Pihl, Stockholm (SE)

(73) Assignee: Tracks Trade & Publishing AB, Stockholm (SE)

( * ) Notice: Subject to any disclaimer, the term of this patent is extended or adjusted under 35 U.S.C. 154(b) by 1359 days.

(21) Appl. No.: 11/013,446

(22) Filed: Dec. 17, 2004

(65) Prior Publication Data
US 2006/0006080 A1 Jan. 12, 2006

(30) Foreign Application Priority Data

Apr. 20, 2004 (EM) .......................... 000169776-0001

(51) Int. Cl.
*B65D 85/57* (2006.01)
(52) U.S. Cl. .................................... 206/312; 206/308.1
(58) Field of Classification Search .................. 206/312, 206/308.1, 311, 309, 45.2, 45.23, 45.24, 206/232; 229/71, 92.8
See application file for complete search history.

(56) References Cited

U.S. PATENT DOCUMENTS

| | | | | |
|---|---|---|---|---|
| 5,662,217 | A * | 9/1997 | Durr | 206/308.1 |
| 5,775,490 | A * | 7/1998 | Baker et al. | 206/308.1 |
| 6,016,907 | A * | 1/2000 | Dreier | 206/232 |
| 6,250,462 | B1 * | 6/2001 | Kato | 206/312 |
| 6,375,003 | B1 * | 4/2002 | Lethen et al. | 206/308.1 |
| 6,446,417 | B1 * | 9/2002 | Lux et al. | 206/312 |
| 6,615,981 | B2 * | 9/2003 | Zenta | 206/308.1 |
| 6,845,865 | B2 * | 1/2005 | Wynalda et al. | 206/308.1 |
| 6,938,769 | B2 * | 9/2005 | So | 206/472 |
| 2003/0006153 | A1 * | 1/2003 | Lux, Jr. et al. | 206/312 |
| 2003/0111368 | A1 * | 6/2003 | Wynalda et al. | 206/308.1 |
| 2003/0217488 | A1 | 11/2003 | Chmiel et al. | |

FOREIGN PATENT DOCUMENTS

| | | |
|---|---|---|
| GB | 2 275 891 A | 9/1994 |
| GB | 2 311 489 A | 10/1997 |
| GB | 2 349 359 A | 11/2000 |
| JP | 8-118852 | 5/1995 |
| WO | WO 97/37350 A1 | 10/1997 |
| WO | WO 00/56555 A1 | 9/2000 |
| WO | WO 02/36355 A1 | 5/2002 |
| WO | WO 02/092358 A1 | 11/2002 |
| WO | WO 03/095224 A1 | 11/2003 |

* cited by examiner

*Primary Examiner* — Ehud Gartenberg
*Assistant Examiner* — Ernesto A Grano
(74) *Attorney, Agent, or Firm* — Birch, Stewart, Kolasch & Birch, LLP

(57) ABSTRACT

The present invention relates to a card assembly comprising a cover and a data storage means. The cover comprises a back sheet, a front sheet and an intermediate sheet, which are integral and connected by one folding line area respectively. The intermediate sheet has a through hole adapted to the data storage means and the data storage means is placed in the through hole. The back sheet, the front sheet and the intermediate sheet are folded together along the folding line areas and permanently attached together, wherein the data storage means is enclosed in a pocket. The back sheet has a tear portion, which is operable to open the pocket and expose a part of the data storage means for enabling removal of the data storage means from the pocket and reinsertion thereof into the pocket. The present invention also relates to a blank for a cover for such a card assembly and to method for manufacturing such a card assembly.

17 Claims, 3 Drawing Sheets

CARD ASSEMBLY

TECHNICAL FIELD OF THE INVENTION

The present invention relates to a card assembly comprising a cover and a data storage means.

BACKGROUND ART

Various types of card assemblies, such as postcards including a CD disc, are known in the state of the art. One such postcard is disclosed in WO02/36355. This known postcard comprises three separate, equally rectangular boards glued on top of each other. The middle board is equipped with a circular aperture for receiving a CD disc of smaller diameter than the aperture. The lower board is equipped with an elastic button which protrudes through the aperture at the centre thereof. When a CD disc is placed over the elastic button in the aperture, it is held on place by the elastic button. The upper board is glued on top of the middle board after a CD disc has been properly inserted whereby the CD disc is enclosed in the post card. The upper board has a printed surface. The upper board has a perforated circular line having the same diameter as the aperture. The circular portion within the perforated line can be torn away to give access to the CD disc.

A disadvantage with this known postcard is that it expensive to manufacture and has a limited use.

SUMMARY OF THE INVENTION

It is therefore an object of the present invention to provide an improved card assembly compared to postcards of the described prior art.

According to one aspect of the invention this object is achieved with a card assembly according to claim 1.

According to a second aspect of the invention this object is achieved with a blank according to claim 14.

According to a third aspect of the invention this object is achieved with a method according to claim 14.

The cover of the card assembly comprises a back sheet, a front sheet and an intermediate sheet, which are integral and connected by one folding line area respectively. The intermediate sheet has a through hole adapted to the data storage means and the data storage means is placed in the through hole. The back sheet, the front sheet and the intermediate sheet are folded together along the folding line areas, such that the back sheet and the front sheet overlap the intermediate sheet on either side thereof, and are permanently attached together. The back sheet and the front sheet overlap the intermediate sheet, on their respective side thereof, at least so much that a closed pocket for the data storage means is formed. The back sheet has a tear portion, which is operable to open the pocket and expose a part of data storage means for enabling removal of the data storage means from the pocket and reinsertion thereof into the pocket.

According to the second aspect of the invention, the cover of the card assembly is made of a blank comprising a strip of card material, which, by two folding line areas, is divided into a back sheet, a front sheet and an intermediate sheet. The back sheet, the front sheet and the intermediate sheet have essentially the same rectangular outline having two short sides and two long sides, wherein the back sheet and the intermediate sheet are connected with the front sheet at opposite short sides thereof. The intermediate sheet has a through hole adapted to a data storage means, and the back sheet has a tear portion adapted to the through hole.

According to the third aspect of the invention, the card assembly can be manufactured by a method comprising the steps of printing and coating the surfaces of a sheet of card material, cutting out strips from the printed and coated sheet of card material, providing the strip with folding line areas, such that the strip, in sequence, is divided into a base sheet, a front sheet and an intermediate sheet, cutting a through hole, which is adapted to data storage means, in the intermediate sheet, providing the back sheet with a tear portion adapted to the through hole, applying glue to, in use, the inward facing surface of the front sheet, folding the intermediate sheet along the associated folding line area and permanently attaching one surface thereof to the front sheet, placing the data storage means in the through hole, applying glue to the other surface of the intermediate sheet, folding the front sheet along the associated folding line area and permanently attaching it to the other surface of intermediate sheet.

A card assembly according to invention comprises a cover and a data storage means.

The phrase "card assembly" includes, for example, postcards, greeting cards, tickets, menus and advertisements.

The phrase "data storage means" includes, for example, a disc shaped storage means such as a CD-record, DVD-disc, CD-ROM disc; a computer diskette; a credit card or a memory card such as for a digital camera.

According to the invention, the data storage means is in a new inventive way enclosed in a new inventive cover.

The cover is made from a blank of a suitable card material such as paper, cardboard or plastic. According to one embodiment, the thickness of the card material is adapted to the thickness of the data storage means.

The blank comprises a back sheet, an intermediate sheet and a front sheet, which are in one peace and at their intersections provided with a folding line area respectively. The folding line areas each comprises one or several folding lines. According to one embodiment having a thick data storage means, there are provided two folding lines between the sheets. According to another embodiment, the folding line area is made relatively broad to suit a thick data storage means.

The intermediate sheet is provided with a through hole adapted to the data storage means. According to one embodiment, the intermediate sheet has about the same thickness as the data storage means and the hole has about the same outline as the data storage means. According to one embodiment, the hole is circular. According to other embodiments is the hole rectangular, square, triangular or star shaped.

In order to assemble the card assembly according to the invention, the data storage means is inserted into the through hole and the cover is folded and secured together. When folded, the back sheet and the front sheet must at least cover the hole with the data storage means. In that a closed pocket for the data storage means is formed. The pocket is limited by the wall of the through hole and the hole covering parts of the front and back sheets. One advantage of the pocket is that it holds the data storage means in place, eliminating the need for any additional elements such as the elastic button in WO02/36355. Thereby production costs are considerably reduced.

Consequently, the outlines of the front sheet, the intermediate sheet and the back sheet need not be the same. According to one embodiment, the intermediate sheet is larger than the front sheet and back sheet.

For accessing the data storage means, the card assembly comprises a tear portion. Contrary to the prior art postcards, the tear portion is located at the back sheet. Thereby, advantageously any image or information on the front sheet is left unaffected when the tear portion is operated. According to one embodiment, the tear portion is partly separable from the back sheet by a weakened line, especially a perforated line. According to another embodiment, the tear portion is completely removable from the back sheet.

By operating the tear portion, the pocket of the data storage means is opened. Thereby at least so much of the hole covering part of back sheet is left intact, that a part of the data storage means is left unexposed in an intact part of the pocket. According to one embodiment, about half of the data storage means is exposed when the tear portion is operated. The other half is by friction forces clamped between the front sheet and the back sheet in the intact part of the pocket.

Consequently, the card assembly allows for repeated removal and insertion of the data storage means without spoiling the appearance of the card. Since the tear portion is placed on the back sheet, any image or information on the surface of the front sheet need not to be destroyed to access the data storage means. Thanks to the openable pocket, the card assembly can function as storage for the data storage means even after the tear portion has been operated. Thereby the use of, for example, a postcard is extended and its user-friendliness increased.

According to on embodiment, after the pocket has been opened, the tear portion will form a support for the card assembly, such that the card assembly will rest on one of the edges thereof and display any image on the front side to the user.

Advantageously, the blank for the cover can be cost-efficient manufactured, by cutting the outline of the blank from a suitably printed sheet of suitable material. The through hole, the folding line areas, and the tear portion are also easily machined. Thanks to the integral sheets and the folding line areas, the alignment of the superimposed sheets in the completed card assembly is simple. The fact that the sheets are integral also contributes to the strength of the completed card assembly, since a folded edge has superior properties compared with exposed edges of superimposed sheets.

Consequently, according to the invention, by providing a cover comprised of integral foldable sheets, and by providing one of the sheets with a through hole for holding the data storage means, a card assembly which can be manufactured cost-efficient and at high speeds is achieved.

According to one embodiment of the invention, the sheets are attached together by glue. Of course any other suitable attachment means can be used, for example tape or staples.

According to one embodiment, the weight of the assembled card assembly with enclosed data storage means is less than 20 g. Thereby advantageously a minimal postage throughout the world is ensured.

According to the invention, the card assembly can have an almost arbitrary outline. According to one embodiment, the card assembly has the rectangular shape and size of a traditional postcard. According to other embodiments, the outline is square, round, triangular or hart shaped.

The sequence of the back sheet, the front sheet and the intermediate sheet along the blank can be chosen to suit the application in question, as also along which sides the sheets are connected.

BRIEF DESCRIPTION OF THE DRAWINGS

The invention may be performed in many various ways and, by way of example only, embodiments thereof will now be described in detail with reference being made to the accompanying drawings, in which.

DETAILED DESCRIPTIONS OF PREFERRED EMBODIMENTS OF THE INVENTION

Figure 1:
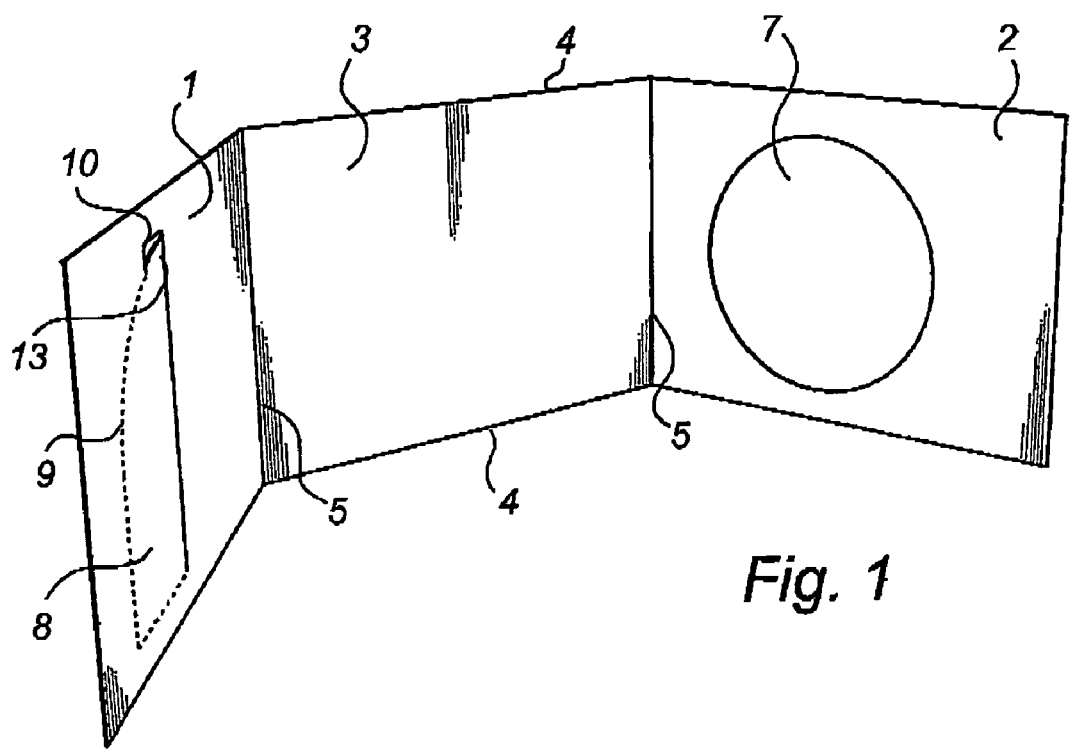
FIG. 1 shows a blank for a card assembly according to a first embodiment of the invention in an almost unfolded position.
Figure 2:
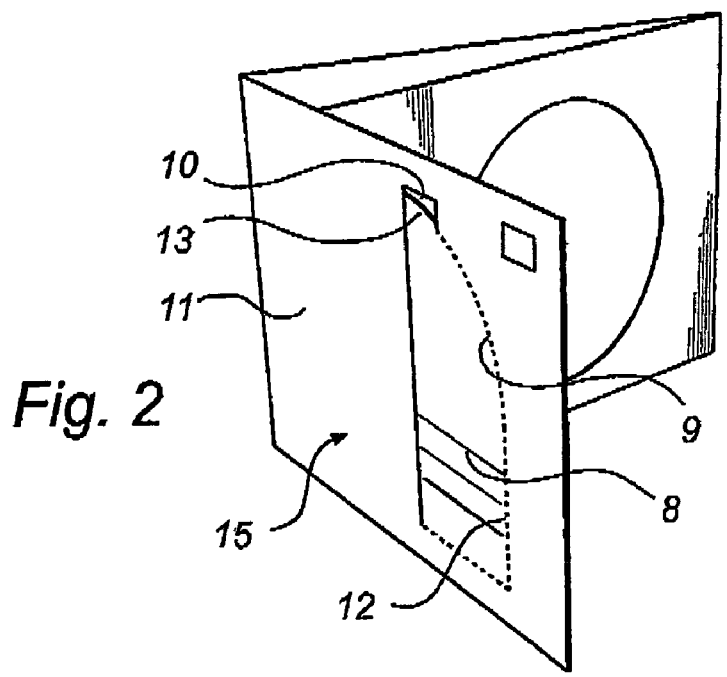
FIG. 2 shows the blank of FIG. 1 in a partly folded position.

With reference to FIGS. 1 and 2, a blank for a card assembly according to a first embodiment of the invention is shown. The card assembly according to the example is a postcard. The blank constitutes an elongated strip of card board. The strip is divided into three equally sized, rectangular pieces 1, 2, 3 by two folding line areas 5 extending across the strip. These pieces form three integrated sheets 1, 2, 3 of the postcard, i.e. a back sheet 1, a front sheet 3 and an intermediate sheet 2. The front sheet 3 has two long sides 4 and two short sides 5 and is connected with the back sheet 1 and the intermediate sheet 2 at one short side 5 respectively. The short sides 5 of the front sheet 3 coincide with the folding line areas 5.

Figure 3:
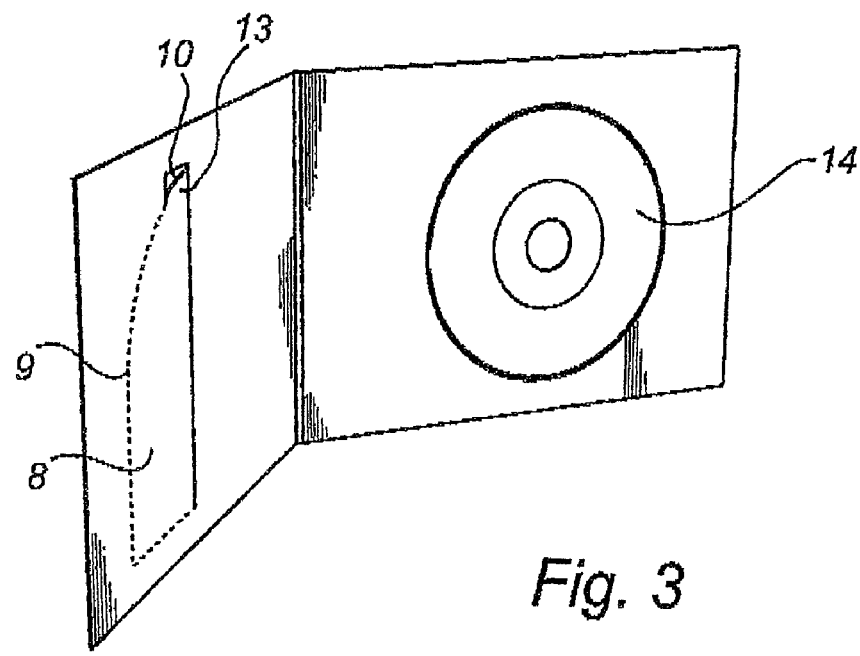
FIG. 3 shows a card assembly according to a first embodiment of the invention with inserted CD disc in a partly folded position.

The intermediate sheet 2 is provided with a circular through hole 7, which is adapted to receive a disc shaped data storage means, in the present embodiment a CD disc 14 (shown in FIG. 3). The hole 7 is located centred in the intermediate sheet 2. The diameter of the hole 7 is about the same as the diameter of the CD disc 14.

Figure 4:
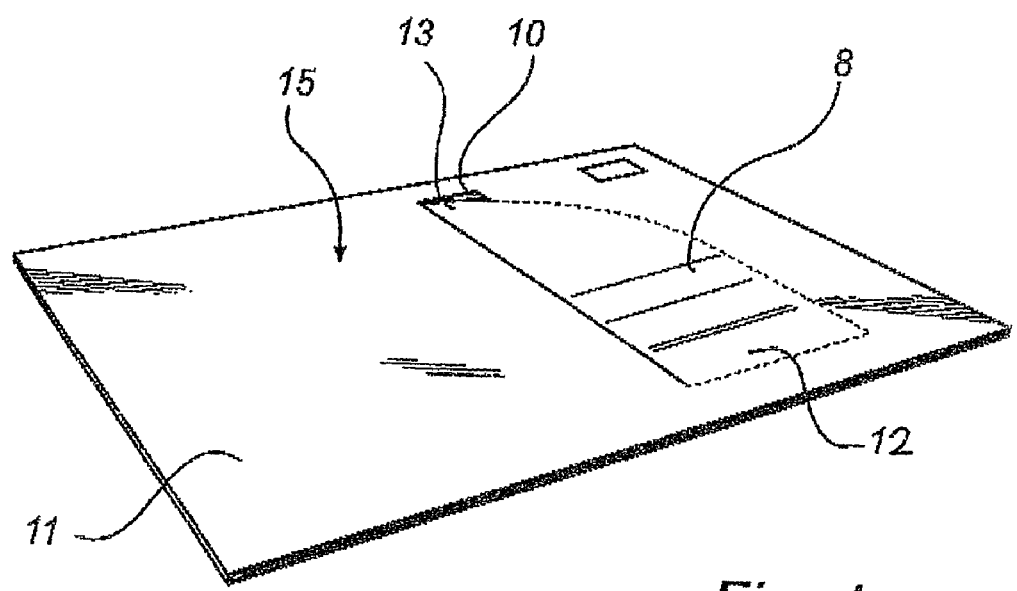
FIG. 4 is a perspective view from behind of the card assembly according to the first embodiment in an assembled position.

With reference to FIGS. 2 and 4, the back sheet 1 has a first side 15, which is exposed when the postcard is assembled. Said first side 15 of the back sheet 1, which is hidden in FIG. 1 and visible in FIG. 2, is divided into a message field 11 and an address field 12.

The back sheet 1 is provided with a tear portion 8, which is partly encircled by a perforated line 9. The tear portion 8 is located in the address field 12 and is integral with the back sheet 1 in the area between the message field 11 and the address field 12. A small opening 10, about the size of a finger tip, is located along the perforated line 9. The tear portion 8 is, at the opening 10, provided with a grip tab 13.

The side of the blank that is hidden in FIG. 1, is printed at the back sheet 1 and the front sheet 3. The front sheet 3 is printed with any desired object or information. The back sheet 1 is printed at the address field 12 with writing lines and an area for a postal stamp. These are the visible sides of the postcard when it is assembled. Consequently, the printing takes place only at one side of the blank, which is advantageous.

The blank according to the example is made of a cardboard being sufficiently rigid to protect a data storage means when enclosed therein, to enable the assembled postcard to be handled by mail sorting machines and to give a user a sense of quality. For good printing results, the cardboard is double coated on the print side. For good runnability in a machine gluing process, the cardboard has a single layer coating on the reverse side. The cardboard comprises a number of plies to ensure good crease and folding characteristics. The outer plies are sufficiently strong to withstand the stress and deformations that occur when the cardboard is creased. Furthermore, the cardboard has at least about the same thickness as the relevant data storage means and is of low weight in order to minimize postal fees. An example of such a cardboard is coated medium gloss FBB (folding box board). When using this cardboard for a postcard according to the first embodiment of the invention for a CD disc 14, the postcard with enclosed CD disc 14 will weigh less than 20 g, ensuring a minimal postage throughout the world.

With reference to FIGS. 1-4, the card assembly according to the first embodiment of the invention may be assembled in the following way.

Firstly, strips for the blanks are cut out from a printed sheet of cardboard with suitable properties. Then the strip is provided with the through hole 7, folding line areas 5 and the perforated line 9. Thereafter glue is applied to, in use, the inward facing side of front sheet 3. In doing so, the central part of the inward facing side of front sheet 3, which in a subsequent step is about to become concentric with the hole 7, is left unaffected. In said subsequent step, the intermediate sheet 2 is folded along the associated folding line area 5 and glued to the front sheet 3. Now, a CD disc, which has been provided with a static charge to achieve a transient stickiness to the postcard, is fitted into the hole 7. The size of the hole 7 is so chosen that the CD disc is held essentially immobile in the hole 7 by friction forces acting on the CD disc. Thereafter, glue is applied around the CD disc on the intermediate sheet 2. In the subsequent step, the back sheet 1 is folded along the associated folding line area 5 and glued to the intermediate sheet 2. Finally, the postcard is equipped with an address, partly over the tear portion, and stamps.

Figure 5:
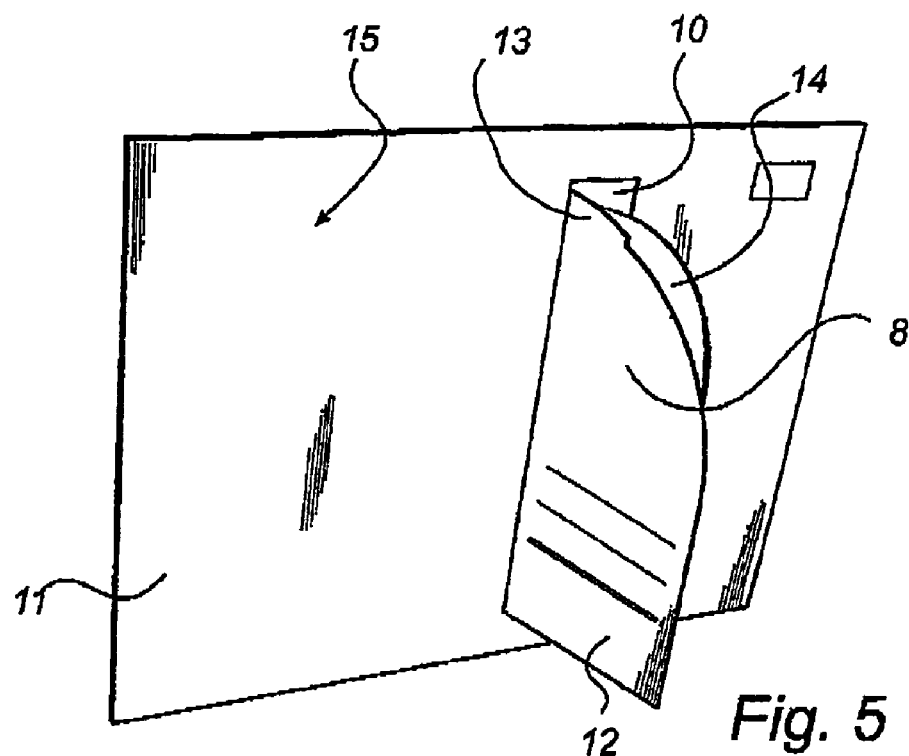
FIG. 5 is a perspective view from behind of the card assembly according to the first embodiment showing the tear portion as a support for the postcard.

With reference especially to FIGS. 4 and 5, a user may access the CD disc after having received the card assembly according to the first embodiment of the present invention in the following way.

The user puts one of his/her fingertips in the opening 10 and catches the grip tab 13 of the tear portion 8. In pulling the tab 13, the user will separate part of the tear portion 8 from the back sheet 1 by breaking the perforated line 9. The tear portion 8 can then be folded along a line in the area between the message field and the address field to expose the CD disc. The user can then remove the CD disc, for example by slightly bending back the address side of the post card, so that the exposed part of the CD disc will flip out of the hole 7, and pull the CD out of the postcard.

After the user is finished, he/she can reinsert the CD disc in the postcard. Then the user inserts the CD disc in the hole, where the CD disc is clamped between the remaining part of the back sheet 1 and the front sheet 3. Consequently, the postcard will also function as a storage case for the CD disc. Furthermore, any printed image on the front sheet 3 or any message in the message field of the back sheet 1 will remain intact since the tear portion is located over the address field 12. In that the storage case will keep any appealing qualities of the post card.

Since the folded tear portion 8 will project about perpendicular from the back sheet, the post card can be supported by the tear portion 8 such that the postcard can be positioned in an upright position, cf. FIG. 5. Any image or information on the front sheet will be displayed in a pleasant way.

Figure 6:
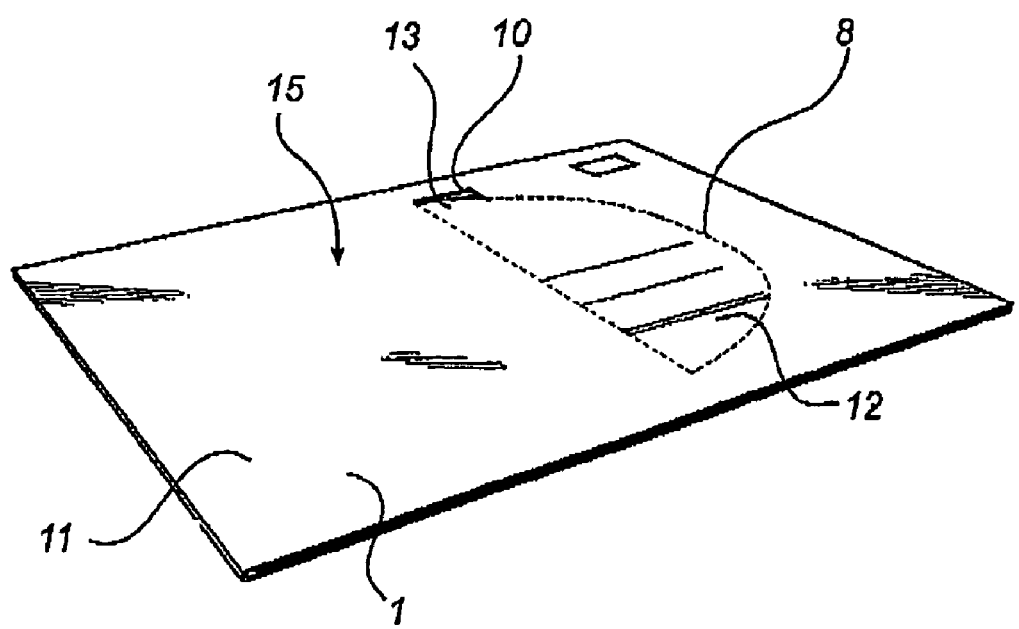
FIG. 6 is a perspective view from behind of a card assembly according to a second embodiment showing an alternative tear portion.

In FIG. 6 a second embodiment of the card assembly according to the present invention is shown. The second embodiment differs from the first embodiment only with regard to the construction and function of the tear portion 8. In the figures, corresponding parts of the different embodiments have the same reference numeral.

According to said second embodiment, the back sheet 1 is provided with a semicircular tear portion 8. The tear portion 8 is encircled by a perforated line 9. A small opening 10, about the size of a finger tip, is located along the perforated line 9. The tear portion 8 is, at the opening 10, provided with a grip tab 13. The tear portion 8 is located in the address field 12.

When the user wishes to access the CD disc, he/she can put one of his/her fingertips in the opening 10 and catch the grip tab 13 of the tear portion 8. In pulling the tab 13, the user will separate the tear portion 8 from the back sheet 1 by breaking the perforated line 9. The address field of the postcard is then destroyed, but since the postcard has reached its destination and the user normally is familiar with the address anyhow, this is of no importance. The removed tear portion 8, exposes half the CD disc, which the user can remove and reinsert in the same way as described in connection with the first embodiment.

The invention claimed is:

1. A card assembly comprising a cover and a data storage means, wherein
   the cover comprises a back cover sheet, a front cover sheet and an intermediate sheet, which are integral and connected by one folding line area respectively,
   the intermediate sheet has a through hole adapted to fit the data storage means placed in the through hole,
   the back sheet, the front sheet and the intermediate sheet are adapted to be folded together along the folding line areas, such that the back sheet and the front sheet overlap the intermediate sheet on either side thereof, and are adapted to be permanently attached together to form a closed pocket for the data storage means,
   wherein the back sheet is foldably connected to one side of the front sheet and the intermediate sheet is foldably connected with an opposite side of the front sheet, and
   wherein the back sheet has a tear portion, the tear portion being sized, configured and adapted to open the pocket and expose only a minor part of the data storage means when fully opened for enabling removal of the data storage means from the pocket and reinsertion thereof into the pocket and to extend in a plane that is substantially perpendicular to the plane in which the back sheet is located, when the tear portion is opened and rotated away from the back sheet, the opened and rotated tear portion is adapted to support the card assembly in substantially upright orientation.

2. The card assembly according to claim 1, wherein the back sheet, the front sheet and the intermediate sheet have substantially the same rectangular outline having two short sides and two long sides, wherein the back sheet and the intermediate sheet are connected with the front sheet at opposite short sides thereof.

3. The card assembly according to claim 2, wherein the back sheet has a message field and an address field, wherein the tear portion is located over the address field.

4. The card assembly according to claim 1, wherein the tear portion is located off centre in the back sheet.

5. The card assembly according to claim 4, wherein the back sheet has a message field and an address field, wherein the tear portion is located over the address field.

6. The card assembly according to claim 1, wherein the tear portion is encircled by a weakened line for enabling separation thereof from the back sheet.

7. The card assembly according to claim 1, wherein the weight thereof is at most 20 g.

8. The card assembly according to claim 1, wherein the data storage means is a disc shaped data storage means.

9. The card assembly according to claim 8, wherein the through hole is circular and has essentially the same diameter as the disc shaped data storage means.

10. The card assembly according to claim 1, wherein the thickness of the intermediate sheet is about equal to the thickness of the data storage means.

11. The card assembly according to claim 1, wherein the back sheet and the front sheet are permanently attached to the intermediate sheet by glue applied to contacting surfaces thereof.

12. The card assembly of claim 1, wherein the tear portion is hingedly adapted to repeatedly open to expose and close to cover the data storage medium.

13. A card assembly comprising a cover and a data storage means, wherein
the cover comprises a back sheet, a front sheet and an intermediate sheet, which are integral and connected by one folding line area respectively,
the intermediate sheet has a through hole adapted to fit the data storage means,
the data storage means is placed in the through hole,
the back sheet, the front sheet and the intermediate sheet are adapted to be folded together along the folding line areas, such that the back sheet and the front sheet overlap the intermediate sheet on either side thereof, and are adapted to be permanently attached together to form a closed pocket for the data storage means,
the back sheet and the front sheet overlap the intermediate sheet, on their respective side thereof, at least so much that a closed pocket for the data storage means is formed, and wherein
the back sheet has a tear portion, which is configured and adapted to open the pocket and expose a part of the data storage means from the pocket and reinsertion thereof into the pocket, and
wherein the tear portion is partly encircled by a weakened line for enabling separating a part of the tear portion from the back sheet and subsequent folding of the tear portion over the not encircled portion, so that when the tear portion is opened and rotated away from the back sheet, the opened and rotated tear portion is adapted to support the card assembly in a substantially upright position, and
wherein the tear portion is sized, configured and adapted to open the pocket and expose only a minor part of the data storage means when fully opened.

14. A blank for a cover for a card assembly comprised of the cover and a data storage means, comprising
a strip of card material, which, by two folding line areas, is divided into a back sheet connected along one of the folding line areas with a front sheet, the front sheet connected along the other one of the folding line areas with an intermediate sheet, the front sheet in-between the back sheet and the intermediate sheet, wherein
the back sheet, the front sheet and the intermediate sheet have essentially the same rectangular outline having two short sides and two long sides, wherein the back sheet and the intermediate sheet are foldably connected with the front sheet at opposite short sides of the front sheet,
the intermediate sheet has a through hole adapted to fit a data storage means, and wherein
the back sheet has a tear portion that is sized, configured and adapted to open to expose only a minor portion of the through hole when fully opened and to close and cover the through hole, and
wherein when the tear portion is opened and rotated away from the back sheet, the opened and rotated tear portion is adapted to support the card assembly in substantially upright orientation.

15. The blank cover of claim 14, wherein the hinged tear portion is hingedly adapted to repeatedly open to expose and close to cover the through hole.

16. A method for manufacturing a card assembly comprised of a cover and a data storage means, comprising the steps of
printing and coating the surfaces of a sheet of card material,
cutting out strips from the printed and coated sheet of card material,
providing each strip with two folding line areas that divide the strip into a back sheet connected along one of the folding line areas with a front sheet, the front sheet connected along the other one of the folding line areas with an intermediate sheet, the front sheet in-between the back sheet and the intermediate sheet, and,
wherein the back sheet, the front sheet and the intermediate sheet have essentially the same rectangular outline having two short sides and two long sides, wherein the back sheet and the intermediate sheet are foldably connected with the front sheet at opposite short sides of the front sheet,
cutting a through hole, which is adapted to hold a data storage means, in the intermediate sheet,
providing the back sheet with a tear portion adapted to cover the through hole, and
wherein when the tear portion is opened and rotated away from the back sheet, the opened and rotated tear portion is adapted to support the card assembly in substantially upright orientation,
applying glue to, in use, an inward facing surface of the front sheet, said inward facing surface facing said intermediate sheet when folded,
folding the intermediate sheet along one of the folding line areas and gluing one surface thereof to the front sheet,
placing the data storage means in the through hole,
applying glue to the other surface of the intermediate sheet,
folding the back sheet along the other one of the folding line areas and permanently attaching it to the other surface of intermediate sheet.

17. A postcard mailing assembly comprising a cover with a message field and an address field and a data storage means,
wherein the cover comprises a back cover sheet, a front cover sheet and an intermediate sheet, which are integral and connected by one folding line area respectively,
the intermediate sheet has a through hole adapted to fit the data storage means placed in the through hole,
the back sheet, the front sheet and the intermediate sheet are adapted to be folded together along the folding line areas, such that the back sheet and the front sheet overlap the intermediate sheet on either side thereof, and are adapted to be permanently attached together to form a closed pocket for the data storage means,
wherein the back sheet is foldably connected to one side of the front sheet and the intermediate sheet is foldably connected with an opposite side of the front sheet, and
wherein the back sheet has a removable tear portion, which is sized, configured and adapted to open the pocket and expose only a minor part of the data storage means when fully opened for enabling removal of the data storage means from the pocket and reinsertion thereof into the pocket and to extend in a plane that is substantially perpendicular to the plane in which the back sheet is located, wherein when the tear portion is opened and rotated away from the back sheet, the opened and rotated tear portion is adapted to support the card assembly in substantially upright orientation, and wherein the removable tear portion of the back sheet contains the postcard address field including address indicia and is adapted to be removed from the postcard mailing assembly without affecting the postcard message field.

* * * * *